US009087134B2

(12) United States Patent
Tierney et al.

(10) Patent No.: US 9,087,134 B2
(45) Date of Patent: Jul. 21, 2015

(54) SYSTEMS AND METHODS FOR DECORATING WEB PAGES

(75) Inventors: Chris Tierney, San Francisco, CA (US); Chris Hostetter, Sacramento, CA (US); Adam Goldband, Antioch, CA (US)

(73) Assignee: CBS Interactive Inc., San Francisco, CA (US)

( * ) Notice: Subject to any disclaimer, the term of this patent is extended or adjusted under 35 U.S.C. 154(b) by 422 days.

(21) Appl. No.: 12/982,354

(22) Filed: Dec. 30, 2010

(65) Prior Publication Data

US 2011/0161800 A1 Jun. 30, 2011

Related U.S. Application Data

(60) Provisional application No. 61/291,771, filed on Dec. 31, 2009.

(51) Int. Cl.
*G06F 17/00* (2006.01)
*G06F 17/30* (2006.01)
*G06F 15/16* (2006.01)
*G06F 17/24* (2006.01)

(52) U.S. Cl.
CPC ............ *G06F 17/3089* (2013.01); *G06F 17/30* (2013.01); *G06F 15/16* (2013.01); *G06F 17/24* (2013.01); *G06F 17/241* (2013.01); *G06F 17/30011* (2013.01)

(58) Field of Classification Search
CPC . G06F 17/30; G06F 17/30011; G06F 17/241; G06F 17/24; G06F 15/16
USPC .................. 715/234–273, 731–744, 200–205
See application file for complete search history.

(56) References Cited

U.S. PATENT DOCUMENTS

| 6,415,335 | B1 | 7/2002 | Lowery et al. | |
|---|---|---|---|---|
| 7,047,318 | B1 | 5/2006 | Svedloff | |
| 7,107,325 | B1 | 9/2006 | Krish | |
| 7,693,840 | B1 * | 4/2010 | Berck et al. | 709/203 |
| 7,958,232 | B1 * | 6/2011 | Colton et al. | 709/224 |
| 2003/0023754 | A1 | 1/2003 | Eichstadt et al. | |
| 2004/0205149 | A1 * | 10/2004 | Dillon et al. | 709/217 |
| 2004/0205513 | A1 | 10/2004 | Chen et al. | |
| 2005/0097095 | A1 | 5/2005 | Halt, Jr. | |
| 2006/0080352 | A1 * | 4/2006 | Boubez et al. | 707/102 |
| 2008/0052663 | A1 | 2/2008 | Cope et al. | |
| 2008/0270929 | A1 * | 10/2008 | Bohn et al. | 715/772 |
| 2009/0031225 | A1 * | 1/2009 | Toebes et al. | 715/760 |
| 2009/0031401 | A1 * | 1/2009 | Cudich et al. | 726/4 |
| 2010/0169763 | A1 * | 7/2010 | Zahavi et al. | 715/234 |
| 2010/0312821 | A1 * | 12/2010 | Bannoura et al. | 709/203 |

OTHER PUBLICATIONS

International Preliminary Report on Patentability as issued in corresponding International application PCT/US2010/062551, dated Jul. 12, 2012.
International Search Report from PCT/US 10/62551, Feb. 23, 2011, pp. 1-2.

* cited by examiner

*Primary Examiner* — Quoc A Tran
(74) *Attorney, Agent, or Firm* — Mahamedi Paradice LLP

(57) ABSTRACT

Computer-implemented methods and systems include proxying a request for a web page from a web server; generating a request for content from one of a plurality of downstream applications corresponding to the request; transmitting the request to the one of the plurality of downstream applications; receiving a response from the one of the plurality of downstream applications, the response including the content; decorating the content to generate a decorated web page; and transmitting the decorated web page to the web server.

13 Claims, 6 Drawing Sheets

SYSTEMS AND METHODS FOR DECORATING WEB PAGES

PRIORITY CLAIM

This application claims the benefit of U.S. Provisional Application No. 61/291,771, filed Dec. 31, 2009, the disclosure of which is incorporated herein by reference in its entirety.

BACKGROUND

Web pages typically have headers, footers and content. Headers and footers are often added to web pages as Server Side Includes ("SSIs") using, for example, Apache's "mod include" module. Such systems for adding headers and footers to web pages may be convenient for adding headers and footers to simple web pages whose content is hosted by a single computing device. However, large websites generally require their code to be split into multiple applications. To handle this, a system architecture may be implemented including multiple layers of plural computing devices with one or more computing device devoted to each application. Using SSIs to include decorations in such architectures requires components, such as headers and footers, to be maintained in separate files. This may greatly increase the time and resources required for code maintenance and may increase the resource use of a front end web server.

To return a webpage with headers and footers added via an SSI in such a tiered system architecture, a web layer (i.e., front end) of the system architecture generally passes a request for the content of the web page to an application layer, the application layer passes the page content back to the web layer, the web layer then retrieves one or more segments of Hypertext Markup Language ("HTML") (e.g., headers and/or footers) from a data store and inserts the HTML into the web page. Of course, a typical system architecture may include plural intermediate layers between a web layer and an application layer, such as caching layers and load balancing layers.

FIG. 1 illustrates a system for decorating web pages with headers and footers. As shown in FIG. 1, the web server 104 (e.g., a front end Apache server) receives requests for web pages 108. For example, in FIG. 1 the web server 104 accesses a cache 116 to access the content for first web page request (request 4505) associated with the first application 120. The web server 104 may also receive requests for a web page 108 associated with a second application 140. First application 120 and second application 140 may each return content for a web page to web server 104. Web server 104 may then insert decorations (e.g., headers and footers) into a webpage, for example for co-branding of web pages. Web server 104 may retrieve decorations according to SSIs which define pre-cached page segments configured to be directly inserted into the web pages from a data store docroot 112 Web server 104 may then insert the decorations into a web page and return the webpage in response to the request.

Decorating pages with SSIs may be resource intensive and modifications to decorations may be slow to deploy. Because page segments inserted via SSIs are pre-cached, for a user to make a change to a page segment, the user may be required to modify the page segment then run a script to deploy the modified page segment. Because changes may be slow to update through the deployment process, a website may be in an inconsistent state during implementation of changes (e.g., if decorators for each page on a website are modified, during the deployment process some pages may display old decorators while other pages display new decorators).

The system of FIG. 1 requires unwanted processing on web server 120 to insert the header and footer components. Because it is often desirable to provide different decorations for pages, for example for co-branding websites, the code for many different decorations may need to be maintained in many a data store accessible by web server 104. Thus, conventional methods of inserting custom headers and footers with custom declarations or SSIs make code maintenance difficult.

While systems and methods are described herein by way of examples and embodiments, those skilled in the art recognize that decorator proxies are not limited to the embodiments or drawings described. It should be understood that the drawings and description are not intended to limit embodiments to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide an architecture having one or more decorator proxies for delivering a website in response to a user request for a website having custom decoration.

A decorator proxy and methods of decorating a web page using a decorator proxy are described. The decorator proxy may be a server (i.e., a computing device), or a tier of servers, that intercepts traffic between a web server and one or more downstream application servers. All traffic from a front end web server to a downstream application server may be routed through the decorator proxy and all decorations for plural web sites may be stored in the decorator proxy. Thus, the decorator proxy may be orthogonal, thereby allowing for decoration (e.g., insertion of headers, footers, and or any other decorations or code segments) of a webpage without affecting the front end web server, application server, or any other computing devices in the system. Orthogonally may increase stability of a system by eliminating or minimizing effects on the rest of the system when decorations may be changed. Additionally, orthogonality may ease implementation of the system. Thus, the decorator proxy proxies requests for content and decorates the content that has been returned from the application server.

The decorator proxy manages headers and footers for multiple applications in one centrally located template repository without the need for extra requests to other applications. This reduces maintenance costs by simplifying code maintenance and may decrease load time for pages.

Figure 1:
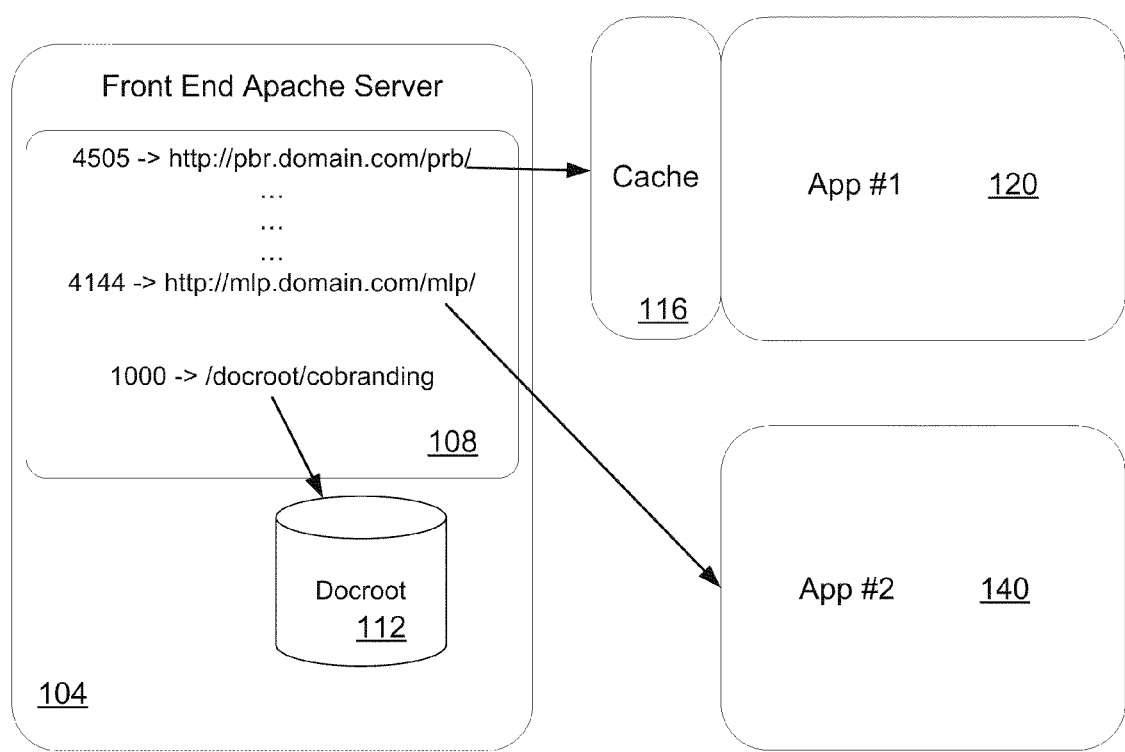
FIG. 1 illustrates a system for decorating web pages with headers and footers.
Figure 2:
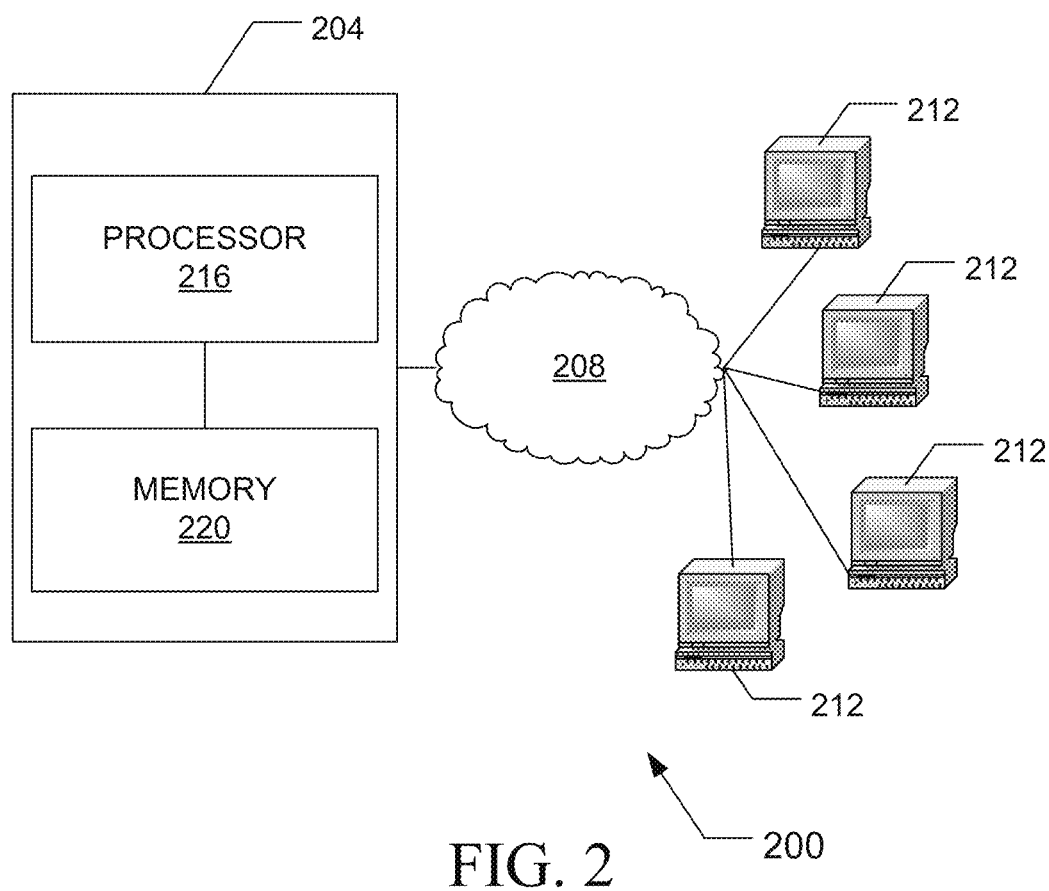
FIG. 2 illustrates a web-based system for delivering content to a user.

FIG. 2 illustrates a web-based system 200 for delivering content to a user. The system 200 includes a host site 204 and a plurality of user systems 212 coupled via a network 208. The system 204 includes a server 216 and memory 220.

The host site 204 is connected to the plurality of user systems 212 over the network 208. The server 216 is in communication with the memory 220. The system 204 is typically a computer system, and may be a Hypertext Transfer Protocol ("HTTP") server (e.g., an Apache server). The memory 220 includes storage media, which may be volatile or non-volatile memory such as read only memory ("ROM"), random access memory ("RAM"), magnetic disk storage media, optical storage media, flash memory devices and zip drives.

The network 208 may be, for example, a local area network ("LAN"), wide area network ("WAN"), a telephone network, such as the Public Switched Telephone Network ("PSTN"), an intranet, the Internet, or any combination thereof. The plurality of user systems 212 may be mainframes, minicomputers, personal computers, laptops, personal digital assistants ("PDA"), cell phones (e.g., smartphones), tablets, and the like. The plurality of user systems 212 are characterized in that they are capable of being connected to the network 208. The plurality of user systems 212 typically include web browsers.

When one of the plurality of user systems 212 requests a web page from host site 204, a request is communicated to the host site 204 over the network 208. The request may include a cookie including data identifying the user and/or the user system 212. The server 216 accesses the database 220 to provide the user with the requested web page, which is communicated to the user over the network 208. For example, another signal may be transmitted that includes a destination address corresponding to the return address of the client system, and a web page responsive to the request.

Figure 3:
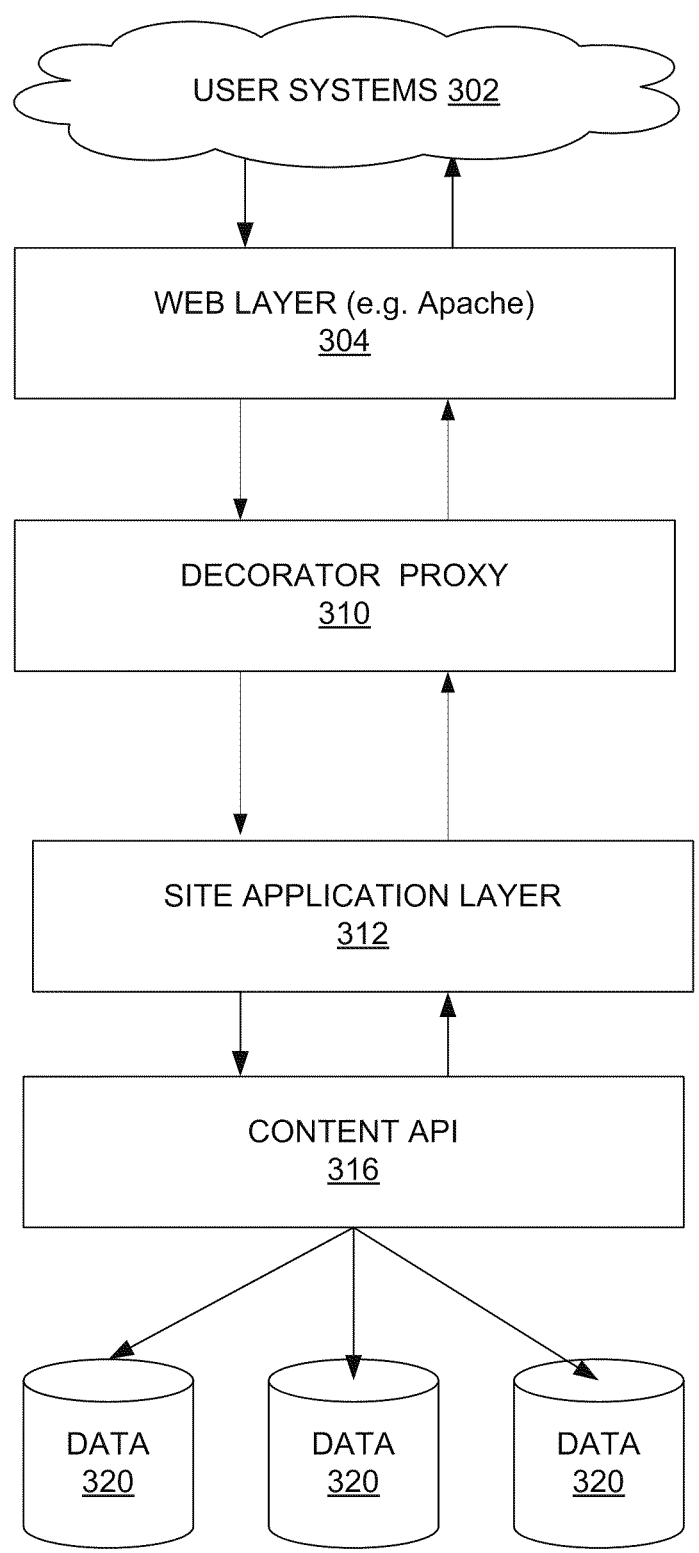
FIG. 3 illustrates a system architecture for decorating web pages with a decorator proxy.

FIG. 3 illustrates a system architecture 300 including a web server 304, a decorator proxy 310, a site application layer 312, content APIs 316 and data stores 320. The system architecture 300 may be characterized in that it includes a proxy servlet, which allows for the creation of the intermediate decorator proxy. The proxy servlet reduces the dependency on SSI calls from the web server to add the headers and footers to the returned web page.

The decorator proxy 310 provides a layer independent of the site applications that can add the headers and footers to web pages. This allows for various interconnected web sites to be branded with the customized headers and/or footers and/or header/footer components. The system architecture 300 can insert headers and footers for each web page via the decorator proxy 310 before delivering a page to the web server 304 for delivery to a user 302.

A web server 304 may receive a request for a webpage from a user system 302 (e.g., a user system 212 of FIG. 2). A web server 304 in system architecture 300 may determine where to direct traffic to machines that sit behind it by parsing the page type requested and may map the request to a set of universal resource locators ("URLs") for systems within the architecture to route the request to. The web server 304 may direct the request to a decorator proxy 310 and include a URL for the application server 312 for the proxy to forward the request to.

For example, a user system 302 may request a web page from web server 304 by transmitting a request for URL "http://review.domain.com/Desktops/4566-666-0.htm?foo=bar". The web server 304 may have mappings defining where the request should be proxied to. For example, the web server 304 may have key mappings indicating that 4566 is an "SSA" page type. Thus, for a web server 304 having an application sever key mapping "SSA => http://ssa-appserver.domain.com:7001/www/", the request would be proxied to "http://ssa-appserver.domain.com:7001/www/4566-666-0.html?foo=bar". Instead, system architecture 300 may prepend the value of a proxy web application and servlet. Thus, for a servlet named "y" and a web application "prox" deployed in a decorator proxy 310, a key mapping to the decorator proxy may be "SSA => http://proxy.domaim.com:7001/prox/y/ssa-appserver.domain.com:7001/www/". Thus, system architecture 300 may direct all SSA pages to pass through the decorator proxy 310 without modification of the site application layer 312.

The request is then transmitted to the decorator proxy 310. The decorator proxy 310 may then hold onto the request (i.e., store the request in memory) and pass the request to the site application layer 312 by stripping the prepended value of the proxy web application and servlet from the URL received by decorator proxy 310. The decorator proxy may maintain an open connection and maintain the request in memory until the request is returned from site application layer 312.

Next, site application layer 312 receives the request and, in accordance with a model-view-controller ("MVC") architecture, requests content from content API 316. Site application layer 312 may implement a Spring framework, an open source framework for the Java platform, to streamline the MVC architecture and make it configurable. Content API 316 may be an API published from a server layer within system architecture 300 as shown or may be a third party API. Content API 316 may retrieve the requested content from one or more data sources 320 and return it to site application 312. Of course, alternative architectures may omit content API 316 and the site application layer 312 may directly retrieve content from one or more data sources 320.

Site application 312 may then be configured to send a response page, including the requested content, downstream to decorator proxy 310. Site application 312 may send the response page in a highly structured format, for example Extensible Markup Language ("XML"), to assist in further parsing and insertion of decorations. Additionally, site application 312 may include a filter configured to parse an HTML response to be sent to decorator proxy 310 into XML and transmit the response to decorator proxy 310 in XML.

Decorator proxy 310 may then receive the response in the open connection from when decorator proxy 310 transmitted the request to site application 312. Decorator proxy 310 may break out the head and body of the response, for example according to XML tags, and insert appropriate decorations, for example via sitemesh decorators. Sitemesh is an open source technology that uses an XML parser to dissect an HTML page into its core elements and then provides a tag library to allow for reassembly of those elements into an outer template. Sitemesh also provides a web page layout and decoration framework. Of course, alternative technologies may be implemented for including headers and footers, for example the Apache Tiles templating framework. In other words, the decorator proxy 310 may decompose the response page, parse the XML tags to determine the head and body, and reassemble the response page inside a template (e.g., a sitemesh template or an Apache Tiles template) with custom headers and footers. At this point the memory storing the initial request received by decorator proxy 310 may be released and the response page, including the decorated header and footer, may be transmitted downstream back to web server 304. Web server 304 may then transmit the decorated web page back to the user system 302.

Conventional teachings may suggest that page load time may be substantially increased (i.e., web pages may load slower) due to the large number of open requests being maintained in a decorator proxy 310 in comparison to a conventional system implementing decoration templates triggered by SSIs and performed at an application layer. However, while embodiments disclosed herein may spawn many memory requests that must be held open until a response is received from site application 312, because each request may only store the details of the request, each request is relatively small, thus allowing memory to free up quickly after each response is received from site application 312. The decorator proxy 310 may only buffer the response received from the application layer 312 when inserting decorations before transmitting the response to the web layer 304.

Indeed, testing has shown no observable impact on page delivery time when serving pages decorated via a proxy rather than at an application layer with SSIs. Average page times for proxied versus non-proxied pages were within five milliseconds of each other and the proxied page type averages were not consistently slower than non-proxied counterparts, suggesting that the variance is statistical noise. Even looking at "slow request" outliers (i.e., longer than one second) under a heavy load (e.g., forty concurrent clients), there was no indication that proxied pages are slower or slow more often than their non-proxied counterparts.

Also, instability caused by processing SSIs on a web layer 304 is minimized by performing decoration of web pages at decorator proxy 310. Additionally, code maintenance is reduced by locating decorations, for example for co-branding, at decoration proxy 310 rather than at web player 304 using SSIs or at each individual application in site application layer 312. Moreover, modifications to decorations may be implemented much more quickly than SSIs may have allowed because of the elimination of pre-caching of page segments.

Further, some implementations may require greater memory usage for each open connection. In such implementations, a front end web server 304 may be configured to transmit a request directly to a site application 312, thereby bypassing the decorator proxy 310. In such embodiments, SSIs may continue to be used to include decorations, thereby reducing resource usage and decreasing page load time.

Figure 4:
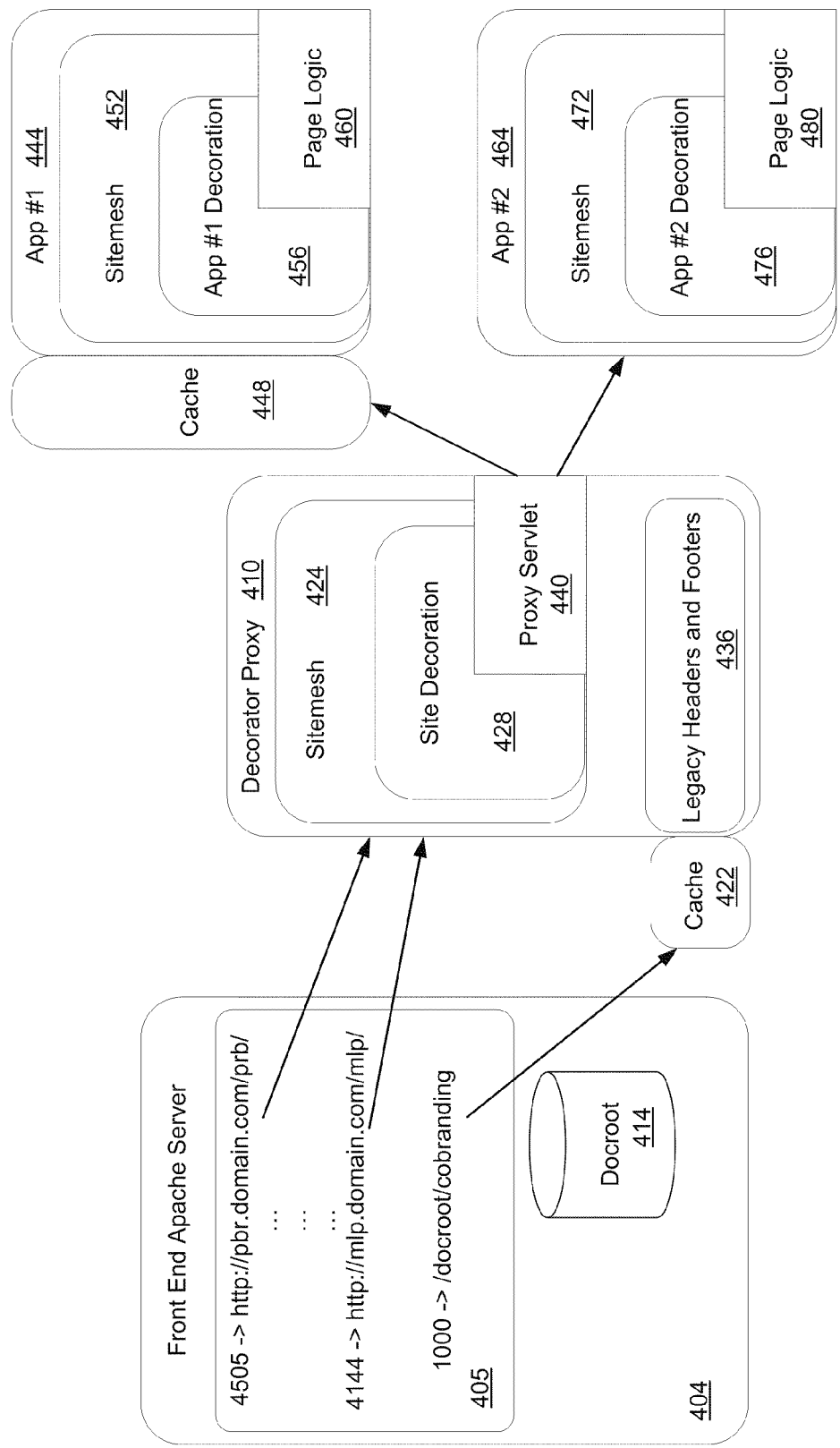
FIG. 4 illustrates a system for decorating web pages with a decorator proxy.

FIG. 4 illustrates a system 400 that includes a web server 404, a decorator proxy 410, a first application 444 and a second application 448. The arrangement of the system 400 may vary from that illustrated in FIG. 4 and may include fewer or additional components. For example, the system 400 may include three or more applications. The web server 404 (e.g., a front end Apache server) receives a plurality of page requests 405. The web server 404 may also include a data store docroot 414 to store page components.

The web server 404 is in communication with the decorator proxy 410. The decorator proxy 410 may include a sitemesh application 424 that includes a site decorator 428. The site decoration 428 includes a proxy servlet 440 that is in communication with the first and second applications 444, 464.

The first application 444 may include a cache 448 and sitemesh 452 that includes decoration content 456 and page logic 460. Sitemesh 452 may be useful to decorate content to be returned by first application 444. Alternatively, sitemesh 452 and decoration content 456 may be omitted from first application 444. The second application 464 may include sitemesh 472 that includes decoration content 476 and page logic 480. Like first application 444, second application 464 may use sitemesh 472 to decorate content to be returned by second application 464 or may omit sitemesh 472 and decoration content 476.

The decorator proxy 410 may also include legacy headers and footers 436 useful for maintaining decorations to be inserted in pages via SSIs in a central location rather than on the web server 404. The decorator proxy may include or be in communication with a cache 422 (e.g., a SQUID cache) configured to pre-cache legacy headers and footers. Of course, cache 422 and legacy headers and footers 436 may be omitted from the decorator proxy 410.

Figure 5:
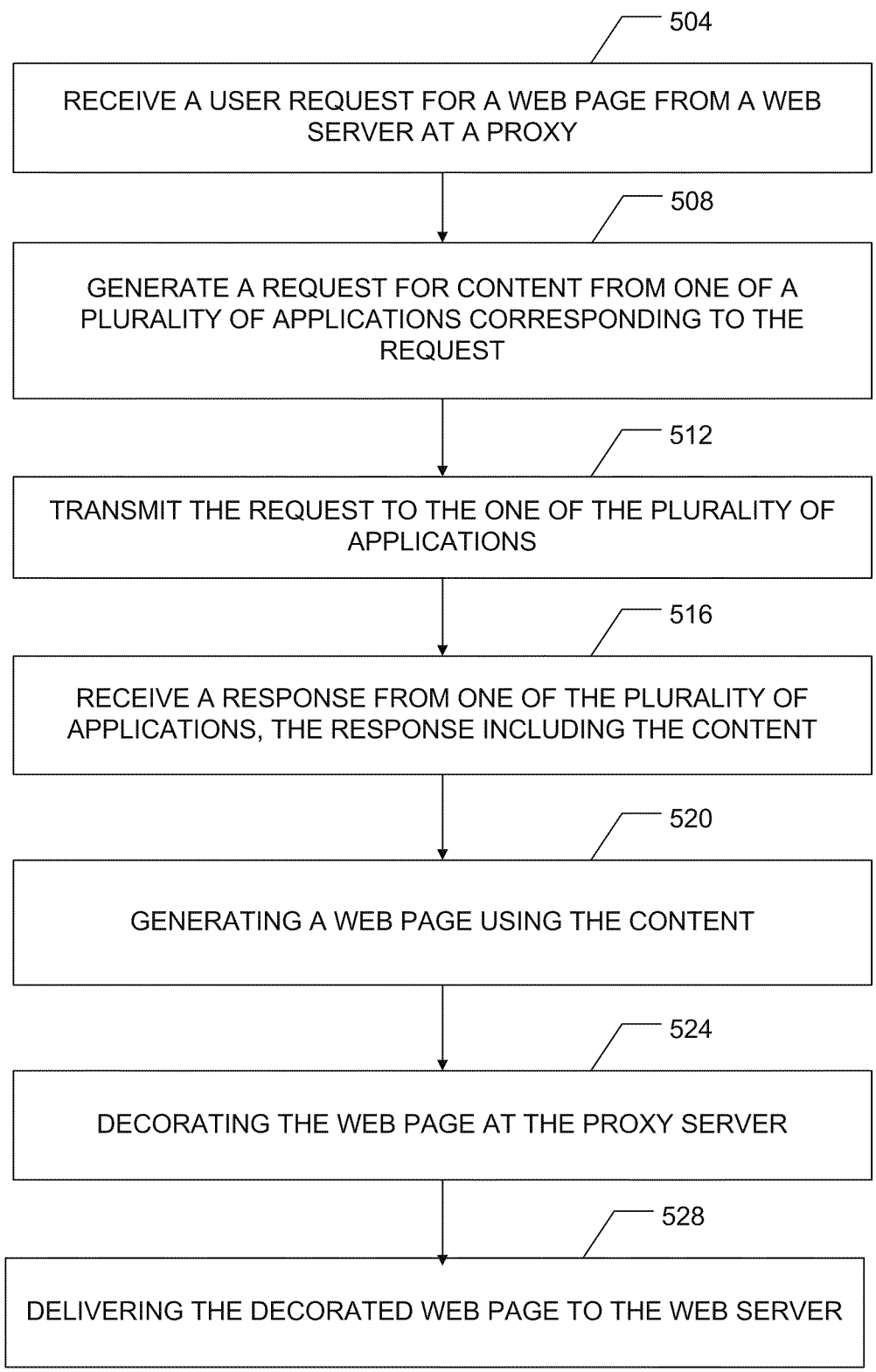
FIG. 5 is a flow diagram of a process for decorating web pages with a decorator proxy.

FIG. 5 illustrates an exemplary process 500 for decorating a web page. Of course, the process 500 described below is merely exemplary and may include a fewer or greater number of steps, and that the order of at least some of the steps may vary from that described below.

The process 500 begins by receiving a user request for a web page from a web server at a proxy (block 504). The process 500 continues by generating a request for content from one of a plurality of applications corresponding to the request at the proxy (block 508), and transmitting the requests to the one of the plurality of applications (block 512). The process 500 continues by receiving a response from one of the plurality of applications, the response including the content (block 516).

The process 500 continues by generating a web page using the content (block 520) and decorating the web page at the proxy server (block 524). The process 500 continues by delivering the decorated web page to the web server (block 528).

Figure 6:
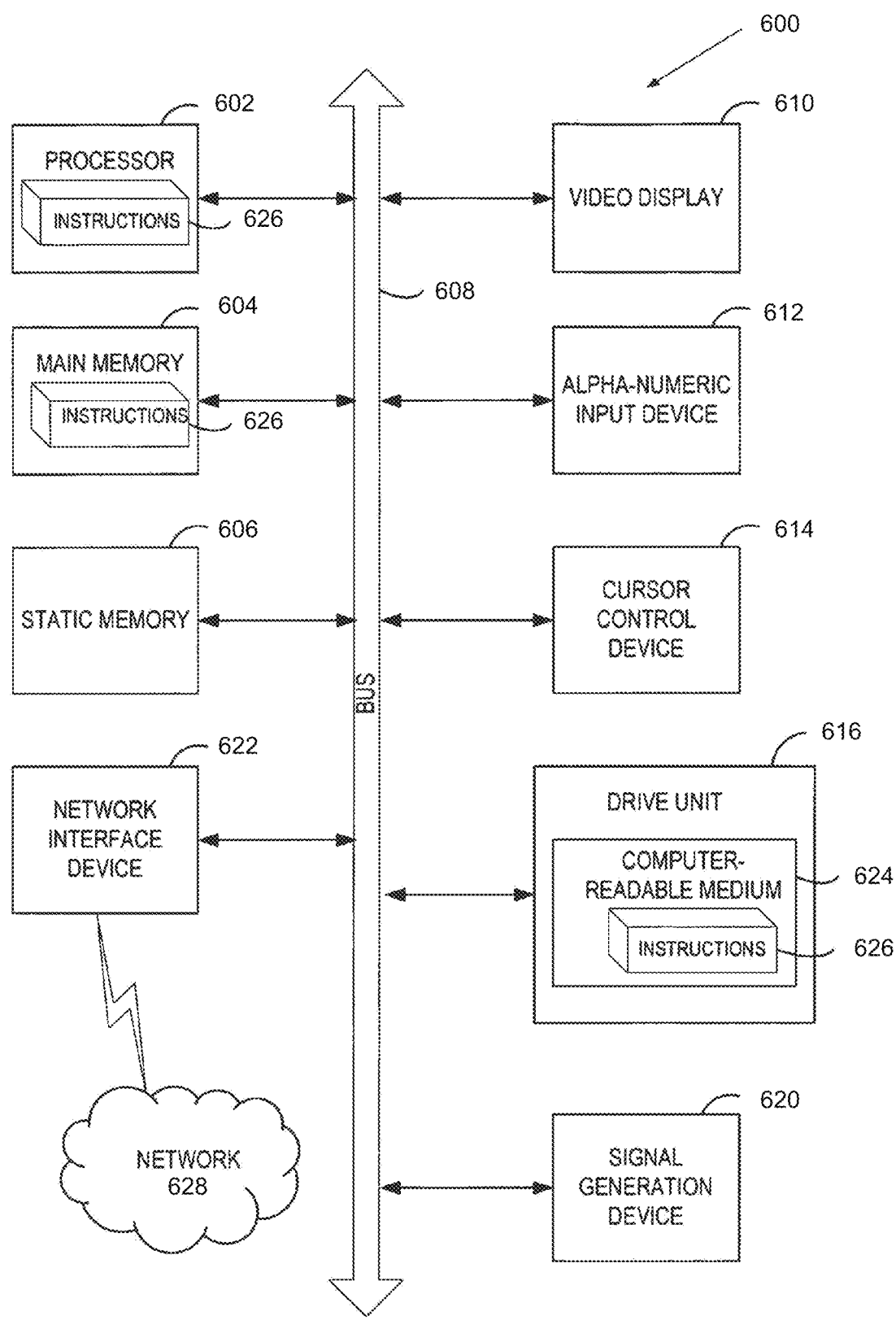
FIG. 6 is a block diagram of an exemplary computer system useful for implementing a decorator proxy.

FIG. 6 shows a diagrammatic representation of a machine in the exemplary form of a computer system 600 within which a set of instructions, for causing the machine to perform any one or more of the methodologies discussed herein, may be executed. The machine may operate as a standalone device or may be connected (e.g., networked) to other machines. In a networked deployment, the machine may operate in the capacity of a server or a client machine in server-client network environment, or as a peer machine in a peer-to-peer, or distributed, network environment. The machine may be a personal computer ("PC"), a tablet PC, a set-top box ("STB"), a Personal Digital Assistant ("PDA"), a cellular telephone, a web appliance, a network router, switch or bridge, or any machine capable of executing a set of instructions, sequential or otherwise, that specify actions to be taken by that machine. Further, while only a single machine is illustrated, the term "machine" shall also be taken to include any collection of machines that individually or jointly execute a set, or multiple sets, of instructions to perform any one or more of the methodologies discussed herein.

The exemplary computer system 600 includes a processor 602 (e.g., a central processing unit ("CPU"), a graphics processing unit ("GPU") or both), a main memory 604 (e.g., read only memory ("ROM"), flash memory, dynamic random access memory ("DRAM") such as synchronous DRAM ("SDRAM") or Rambus DRAM ("RDRAM"), etc.) and a static memory 606 (e.g., flash memory, static random access memory ("SRAM"), etc.), which communicate with each other via a bus 608.

The computer system 600 may further include a video display unit 610 (e.g., a liquid crystal display ("LCD") or a cathode ray tube ("CRT")). The computer system 600 also includes an alphanumeric input device 612 (e.g., a keyboard), a cursor control device 614 (e.g., a mouse), a disk drive unit 616, a signal generation device 620 (e.g., a speaker) and a network interface device 622.

The disk drive unit 616 includes a computer-readable medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 602 also constituting computer-readable media. The software 626 may further be transmitted or received over a network 628 via the network interface device 622.

While the computer-readable medium 624 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any tangible medium that is capable of storing, encoding or carrying a set of instructions for execution by the machine and that cause the machine to perform any one or more of the methodologies disclosed herein. The term "computer-readable storage medium" shall accordingly be taken to include, but not be limited to, solid-state memories, and optical and magnetic media.

It should be noted that the server is illustrated and discussed herein as having various modules which perform particular functions and interact with one another. It should be understood that these modules are merely segregated based on their function for the sake of description and represent computer hardware executing code and/or executable software code which is stored on a tangible computer-readable medium for execution on appropriate computing hardware. The various functions of the different modules and units can be combined or segregated as hardware and/or software stored on a computer-readable medium as above as modules in any manner, and can be used separately or in combination.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The embodiments have been described in relation to particular examples, which are intended in all respects to be illustrative rather than restrictive. Those skilled in the art will appreciate that many different combinations of hardware, software, and firmware will be suitable for practicing the present embodiments. The computer devices can be PCs, handsets, servers, PDAs or any other device or combination of devices which can carry out the disclosed functions in response to computer readable instructions recorded on media. The phrase "computer system", as used herein, therefore refers to any such device or combination of such devices.

Moreover, other implementations will be apparent to those skilled in the art from consideration of the specification and practice of the embodiments disclosed herein. Various aspects and/or components of the described embodiments may be used singly or in any combination. It is intended that the specification and examples be considered as exemplary only.

Embodiments have been disclosed herein. However, various modifications can be made without departing from the scope of the embodiments as defined by the appended claims and legal equivalents.

What is claimed is:

1. A computer-implemented method for decorating webpages, the method performed by one more processors of a proxy server and comprising:
   receiving a content request from a web server, the content request corresponding to (i) a browser request submitted to the web server from a user device, and (ii) webpage content stored in one or more application servers, the webpage content including an HTML page;
   storing the content request in a memory of the proxy server; forwarding the content request to the one or more application servers; receiving the webpage content from the one or more application servers;
   in response to receiving the webpage content, retrieving header and footer content from a page segment repository of the proxy server; inserting header and footer content into the webpage content to form a completed webpage;
   transmitting the completed webpage to the web server for transmission to the user device; and
   wherein the content request includes a number of server side includes Server Side Includes (SSIs), the method further comprising:
   prior to forwarding the content request to the one or more application servers, stripping the SSIs from the content request;
   wherein retrieving the header and footer content from the page segment repository is based on the SSIs of the content request; and
   wherein the proxy server is to utilize an XML parser to (i) dissect the HTML page into one or more core elements and (ii) create a tag library to reassemble the core elements, including the header and footer content, into the HTML page.

2. The method of claim 1, wherein inserting the header and footer content comprises dissecting the HTML page into the core elements and reassembling the HTML page to include the header and footer content.

3. The method of claim 2, wherein the proxy server is to implement a sitemesh application in order to dissect the HTML page into the core elements and reassemble the core elements, including the header and footer content.

4. The method of claim 1, wherein forwarding the content request to the one or more application servers includes establishing an open connection with the one or more application servers until the webpage content is received.

5. The method of claim 1, wherein inserting the header and footer content comprises calling in components of the webpage content from the one or more application servers to define the header and footer content of the completed webpage.

6. The method of claim 1, wherein inserting the header and footer content comprises applying tiles to the webpage content.

7. A non-transitory computer-readable storage medium storing instructions that, when executed by one or more processors of a proxy server, cause the proxy server to perform operations comprising:
   receiving a content request from a web server, the content request corresponding to (i) a browser request submitted to the web server from a user device, and (ii) webpage content stored in one or more application servers;
   storing the content request in a memory of the proxy server; forwarding the content request to the one or more application servers;

receiving the webpage content from the one or more application servers, the webpage content including an HTML page;

in response to receiving the webpage content, retrieving header and footer content from a page segment repository of the proxy server;

inserting the header and footer content into the webpage content to form a completed webpage;

transmitting the completed webpage to the web server for transmission to the user device; and wherein the content request includes a number of server side includes Server Side Includes (SSIs), and wherein the executed instructions further cause the proxy server to: prior to forwarding the content request to the one or more application servers, stripping the SSIs from the content request;

wherein retrieving the header and footer content from the page segment repository is based on the SSIs of the content request; and wherein the proxy server is to utilize an XML parser to (i) dissect the HTML page into one or more core elements and (ii) create a tag library to reassemble the core elements, including the header and footer content, into the HTML page.

8. The non-transitory computer-readable storage medium of claim 7, wherein inserting the header and footer content comprises dissecting the HTML page into the core elements and reassembling the HTML page to include the header and footer content.

9. The non-transitory computer-readable storage medium of claim 7, wherein forwarding the content request to the one or more application servers includes establishing an open connection with the one or more application servers until the webpage content is received.

10. A proxy server comprising:
a page segment repository storing decoration content for webpages;
a processor coupled to the page segment repository; and
one or more memory resources storing instructions that, when executed by the processor, cause the proxy server to:
receive a content request from a web server, the content request corresponding to (i) a browser request submitted to the web server from a user device, and (ii) webpage content stored in one or more application servers, the webpage content including an HTML page;
store the content request in the one or more memory resources, forward the content request to the one or more application servers, receive the webpage content from the one or more application servers;
in response to receiving the webpage content, retrieving header and footer content from the page segment repository;
insert the header and footer content into the webpage content to form a completed webpage;
transmit the completed webpage to the web server for transmission to the user device; and
wherein the content request includes a number of server side includes (SSIs), and wherein the executed instructions further cause the proxy server to:
prior to forwarding the content request to the one or more application servers, strip the SSIs from the content request;
wherein retrieving the header and footer content from the page segment repository is based on the SSIs of the content request; and
wherein the proxy server is to utilize an XML parser to (i) dissect the HTML page into one or more core elements and (ii) create a tag library to reassemble the core elements, including the header and footer content, into the HTML page.

11. The proxy server of claim 10, wherein inserting the header and footer content comprises dissecting the HTML page into the core elements and reassembling the HTML page to include the header and footer.

12. The proxy server of claim 11, wherein the proxy server is to implement a sitemesh application in order to dissect the HTML page into the core elements and reassemble the core elements, including the header and footer content.

13. The proxy server of claim 10, wherein forwarding the content request to the one or more application servers includes establishing an open connection with the one or more application servers until the webpage content is received.

* * * * *